3,213,161
PROCESS FOR FORMING A URANIUM MONONITRIDE-URANIUM DIOXIDE NUCLEAR FUEL

Richard A. Craig, West Hartford, Conn., assignor to the United States of America as represented by the United States Atomic Energy Commission
No Drawing. Filed Dec. 27, 1963, Ser. No. 334,060
2 Claims. (Cl. 264—.5)

This invention deals with an improved nuclear fuel of the ceramic type and more particularly with a fuel based on uranium mononitride.

Uranium mononitride has been found an attractive fuel material for compact high-temperature nuclear reactors because of its high melting point, high uranium concentration and high uranium "loading," and high thermal conductivity which above 815° C. increases with increasing temperatures.

Uranium mononitride, however, has a number of drawbacks. It is difficult to produce the stoichiometric compound by normal casting or sintering techniques, because it chemically decomposes at temperatures of about 1650° C. and above, this in a vacuum as well as in an inert atmosphere. It has been considered to avoid this drawback by sintering in a nitrogen atmosphere; however, higher nitrides are then formed which have a lower density than the mononitride and a lower uranium concentration. Another drawback of uranium mononitride is that it experiences grain growth at temperatures above about 2038° C.

It is an object of this invention to provide a nuclear uranium mononitride fuel that has a higher density than the customary uranium mononitride.

It is another object of this invention to provide a nuclear uranium mononitride fuel that undergoes less grain growth at elevated temperature than does uranium mononitride.

It is also an object of this invention to provide a nuclear uranium mononitride fuel that is characterized by an especially great strength.

It is finally also an object of this invention to provide a uranium mononitride nuclear fuel material that has an especially long service life when used in high-temperature reactors.

It has been found that by the addition of a small quantity, preferably from 3 to 7% by weight, of uranium dioxide to uranium mononitride prior to sintering a fuel material of greatly improved properties is obtained. The uranium dioxide addition was found to inhibit grain growth of the nitride at high temperatures and to result in a product of greater density than that of sintered uranium mononitride. The product of this invention usually has a density of about 98% of the theoretical density. The uranium dioxide, by microscopic examination, was found to deposit during the sintering process along the grain boundaries of the nitride. It thereby forms a barrier for fission product gases formed in the nitride fuel during neutron bombardment and prevents their escape from the core material into the jacket or can. Since the core material is stronger and less flexible than the jacket or can, a better retention of fission product gases is accomplished due to the barrier. Another advantage inherent in this feature is that no volume increase and no buckling of the can or jacket take place.

The invention thus comprises admixing from 3 to 7%, but preferably 5%, by weight of powdered uranium dioxide with powdered uranium mononitride until homogeneity is obtained; compacting the mixture, and sintering the mixture into the shape desired, for instance into pellets. Sintering is preferably carried out at 2260° C., a temperature that is higher than the decomposition temperature of the pure mononitride. Up to this temperature uranium dioxide was found not to react with the uranium mononitride.

In the following, an example is given to illustrate the advantages accomplished by the invention.

Example

Four uranium nitride pellets, each ¼" in diameter and ¼" long, were prepared; two of these pellets consisted of uranium mononitride only, while for the other two pellets 5% by weight of uranium dioxide, with reference to the uranium nitride, were incorporated.

The four pellets were made by the same procedure comprising mixing the finely powdered materials for homogeneity, compacting in an argon atmosphere by a pressure of 75 p.s.i., and subsequent sintering in a vacuum furnace having a graphite heating element. The sintering process consisted of the following steps:

(a) Heating to 1538° C. in a vacuum and holding there for one hour; (b) adding nitrogen to a pressure of 530 mm. Hg; (c) heating at 2038° C. for two hours; (d) heating at 2260° C. for two hours; (e) cooling to 1538° C. and exhausting to a vacuum of $2 \times 10^{-4}$ torr; and (f) cooling to room temperature.

All of the pellets thus produced were examined as to densities, weight and oxygen content. The results are summarized in the table below.

| Run No. | Material | Particle Size, microns | Sintered Pellet ||||
|---|---|---|---|---|---|---|
| | | | Oxygen Content, p.p.m. | Weight, grams | Density, g./cc. | Percent of Theoretical Density |
| 1 | UN | 1.5 | 980 | 2.9475 | 13.95 | 97.4 |
| 2 | UN+5 w/o $UO_2$ | 1.5 | 6,910 | 2.6064 | 14.15 | 98.8 |
| 3 | UN | 3 | 1,000 | 2.5205 | 13.31 | 96.4 |
| 4 | UN+5 w/o $UO_2$ | 3 | 6,930 | 2.6342 | 13.95 | 97.4 |

The above data show that the addition of $UO_2$ brought about a density increase of at least 1% which in reactor technology is an important improvement.

It will be understood that the invention is not to be limited to the details given herein but that it may be modified within the scope of the appended claims.

The embodiments of the invention in which an exclusive property or privilege is claimed are defined as follows:

1. A process of making nuclear fuel, comprising mixing uranium mononitride and uranium dioxide powers, compacting the mixture obtained in an inert atmosphere and sintering it at a maximum temperature of 2260° C.

2. A process of making nuclear fuel, comprising mixing uranium mononitride powder and about 5% by weight of uranium dioxide powder, compacting the mixture in an argon atmosphere, heating the mixture in a vacuum for about one hour at 1538° C., adding nitrogen and heating at 2038° C. for two hours and then at 2260° C. for two hours, cooling to 1538° C. while applying a vacuum, and cooling to room temperature.

References Cited by the Examiner

AEC Document ORO-248, Dec. 14, 1959. Pages 2-9.

CARL D. QUARFORTH, *Primary Examiner.*

BENJAMIN R. PADGETT, *Examiner.*

UNITED STATES PATENT OFFICE
CERTIFICATE OF CORRECTION

Patent No. 3,213,161 October 19, 1965

Richard A. Craig

It is hereby certified that error appears in the above numbered patent requiring correction and that the said Letters Patent should read as corrected below.

Column 2, line 18, for "p.s.i." read -- tsi --; line 26, for "exhausing" read -- exhausting --; same column 2, line 52, for "powers" read -- powders --.

Signed and sealed this 27th day of September 1966.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,213,161                                             October 19, 1965

Richard A. Craig

It is hereby certified that error appears in the above numbered patent requiring correction and that the said Letters Patent should read as corrected below.

Column 2, line 18, for "p.s.i." read -- tsi --; line 26, for "exhausing" read -- exhausting --; same column 2, line 52, for "powers" read -- powders --.

Signed and sealed this 27th day of September 1966.

(SEAL)

Attest:

ERNEST W. SWIDER                                      EDWARD J. BRENNER

Attesting Officer                                         Commissioner of Patents